United States Patent
Quast et al.

(10) Patent No.: US 10,165,232 B2
(45) Date of Patent: Dec. 25, 2018

(54) METHOD FOR MONITORING A PARKING FACILITY FOR MOTOR VEHICLES, AND DRONE

(71) Applicant: Robert Bosch GmbH, Stuttgart (DE)

(72) Inventors: Gerrit Quast, Nuertingen (DE); Rolf Nicodemus, Bietigheim-Bissingen (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 15/423,858

(22) Filed: Feb. 3, 2017

(65) Prior Publication Data

US 2017/0237948 A1    Aug. 17, 2017

(30) Foreign Application Priority Data

Feb. 11, 2016    (DE) .......................... 10 2016 202 033

(51) Int. Cl.
*H04N 7/18*   (2006.01)
*B64C 39/02*   (2006.01)

(52) U.S. Cl.
CPC ............. *H04N 7/185* (2013.01); *B64C 39/02* (2013.01); *B64C 39/024* (2013.01); *B64C 2201/027* (2013.01); *B64C 2201/123* (2013.01); *B64C 2201/127* (2013.01); *B64C 2201/141* (2013.01); *B64C 2201/146* (2013.01)

(58) Field of Classification Search
None
See application file for complete search history.

(56) References Cited

U.S. PATENT DOCUMENTS

| | | | |
|---|---|---|---|
| 9,629,220 B2 * | 4/2017 | Panopoulos | F21V 14/02 |
| 9,733,644 B2 * | 8/2017 | Levien | G05D 1/0011 |
| 9,858,816 B2 * | 1/2018 | Cook | G08G 1/14 |
| 2008/0266138 A1 * | 10/2008 | Ponert | G08G 1/04 340/932.2 |
| 2014/0025229 A1 * | 1/2014 | Levien | G05D 1/0011 701/2 |
| 2015/0027808 A1 * | 1/2015 | Baillargeon | B66F 17/006 182/3 |
| 2015/0035437 A1 * | 2/2015 | Panopoulos | F21V 14/02 315/112 |
| 2015/0339924 A1 * | 11/2015 | Cook | G08G 1/14 382/104 |
| 2016/0371609 A1 | 12/2016 | Nordbruch | |
| 2017/0092130 A1 * | 3/2017 | Bostick | G08G 1/143 |

FOREIGN PATENT DOCUMENTS

| | | |
|---|---|---|
| DE | 102012222562 A1 | 6/2014 |
| DE | 102014223931 A1 | 5/2016 |
| DE | 102014226458 A1 | 6/2016 |
| DE | 102015211123 A1 | 12/2016 |

* cited by examiner

*Primary Examiner* — Reza Aghevli
(74) *Attorney, Agent, or Firm* — Norton Rose Fulbright US LLP; Gerard Messina

(57) ABSTRACT

A method for monitoring a parking facility for motor vehicles, the parking facility being monitored by way of a monitoring device of a flying drone. A drone and a computer program are also described.

15 Claims, 1 Drawing Sheet

METHOD FOR MONITORING A PARKING FACILITY FOR MOTOR VEHICLES, AND DRONE

CROSS REFERENCE

The present application claims the benefit under 35 U.S.C. § 119 of German Patent Application No. DE 102016202033.1 filed on Feb. 11, 2016, which is expressly incorporated herein by reference in its entirety.

FIELD

The present invention relates to a method for monitoring a parking facility for motor vehicles. The present invention further relates to a drone and to a computer program.

BACKGROUND INFORMATION

German Patent Application No. DE 10 2012 222 562 A1 describes a system for managed parking areas, for transferring a vehicle from a starting position to a destination position. The system encompasses surroundings sensors disposed in stationary fashion in order to ensure continuous tracking of the vehicle upon transfer.

SUMMARY

An object on which the present invention relates to efficient monitoring of a parking facility for motor vehicles.

Advantageous embodiments of the present invention are described herein.

According to one aspect, a method for monitoring a parking facility for motor vehicles is furnished, the parking facility being monitored by way of a monitoring device of a flying drone.

According to another aspect, a drone encompassing a monitoring device, for monitoring a parking facility for motor vehicles, is furnished, the drone being configured to carry out or execute the method for monitoring a parking facility for motor vehicles.

According to another aspect a computer program is furnished, which program encompasses program code for carrying out the method for monitoring a parking facility for motor vehicles when the computer program is executed on a computer, in particular on a drone.

The present invention is based on the realization that the above object can be achieved by the fact that the monitoring device is no longer disposed in stationary fashion within the parking facility but instead is encompassed by a drone. The flying drone can thus, advantageously, efficiently monitor the parking facility by way of the monitoring device. In particular, this produces the technical advantage that fewer (compared with the case described in the introduction to the description) or no surroundings sensors now need to be disposed in stationary fashion within the parking facility for monitoring purposes.

If surroundings sensors disposed in stationary fashion within the parking facility happen to be present for monitoring purposes, those surroundings sensors as a rule do not detect all regions of the parking facility. In other words, there can be regions within the parking facility which are not monitored by way of a surroundings sensor. The drone, however, can advantageously fly to such regions in order to monitor those regions by way of the monitoring device.

This therefore produces the technical advantage that a parking facility for motor vehicles can be efficiently monitored. The technical advantage produced is, in particular, that an efficient concept for efficient monitoring of a parking facility for motor vehicles is furnished.

The monitoring will therefore produce, in particular, the technical advantage that the parking facility can be efficiently operated.

In one embodiment, the parking facility is operated based on the monitoring.

A "parking facility" for purposes of the present invention serves as a parking area for motor vehicles. The parking facility thus constitutes in particular a continuous area that encompasses several parking locations (in the context of a parking facility on private property) or parking spaces (in the context of a parking facility on public property). According to one embodiment the parking facility is configured as a parking structure. According to a further embodiment the parking facility is configured as a parking garage.

A "drone" for purposes of the present invention refers to an unmanned aerial vehicle.

According to one embodiment, provision is made that the drone is configured as a helicopter. In a further embodiment, provision is made that the drone is configured as a quadcopter.

According to one embodiment, provision is made that the drone is configured to be remotely controlled. The drone can therefore be remotely controlled. In other words, in particular, the drone can be operated in a remote-control mode. According to one embodiment, the drone is therefore remotely controllable.

In one embodiment, the drone is remotely controlled.

In one embodiment, provision is made that the drone is configured to fly autonomously. In other words, in particular, the drone can fly autonomously. In other words, in particular, the drone is operable in an autonomous operating mode. In other words, in particular, the drone can be operated in an autonomous operating mode. The drone is therefore, in particular, an autonomous drone.

In one embodiment, the drone flies autonomously.

According to one embodiment, provision is made that the drone both is remotely controllable and can fly autonomously. In other words, the drone can therefore be operated both in the remote-control mode and in the autonomous operating mode. In other words, according to one embodiment, provision is therefore made that operation can switch over between the two operating modes.

According to one embodiment, the monitoring device encompasses one or several surroundings sensors. A surroundings sensor is, in particular, one of the following surroundings sensors: radar sensor, video sensor, laser sensor, lidar sensor, ultrasonic sensor, magnetic sensor, and infrared sensor.

According to one embodiment, provision is made that the monitoring device is configured to ascertain monitoring data corresponding to the monitoring.

According to one embodiment, provision is made that monitoring data corresponding to the monitoring are ascertained.

If the monitoring device encompasses one or several surroundings sensors, such monitoring data encompass, for example, surroundings sensor data. Surroundings sensor data correspond in particular to respective surroundings around the drone detected by way of the surroundings sensor or sensors.

In other words, the flying drone, during its flight, therefore detects one or several sub-regions of the parking facility by way of the surroundings sensor or sensors, in order to ascertain the detection of corresponding surroundings sensor data.

According to one embodiment, provision is made that the drone has a communication interface.

According to one embodiment, the communication interface is configured to communicate via a wireless communication network.

A wireless communication network encompasses, for example, a WLAN communication network.

According to one embodiment, a wireless communication network encompasses a mobile radio communication network.

According to one embodiment, a communication via the wireless communication network becomes and/or is encoded.

In other words, the communication interface is therefore configured to receive data via the communication network and/or to transmit data via the communication network.

Such data encompass, for example, surroundings sensor data, monitoring data, driving data, remote-control instructions, and/or control instructions, which will be explained in further detail by way of example below.

In a further embodiment, provision is made that the drone has the communication interface by way of which monitoring data corresponding to the monitoring are transmitted via a wireless communication network to a motor vehicle located within the parking facility and/or to a parking facility management system for managing the parking facility.

This produces in particular the technical advantage that, for example, based on the monitoring data the motor vehicle can drive and/or navigate efficiently within the parking facility, in particular partly autonomously, in particular fully autonomously. In other words, thanks to the use of a flying drone it is therefore possible for the motor vehicle already to look, indirectly via the monitoring data, into regions of the parking facility that it cannot yet itself detect by way of its own surroundings sensor suite.

The fact that the monitoring data are transmitted in particular to the parking facility management system via the communication network produces, in particular, the technical advantage that the parking facility management system can operate the parking facility efficiently. The parking facility management system can in particular, based on the monitoring data, efficiently remotely control a motor vehicle located within the parking facility and/or efficiently assist it in its partly autonomous, in particular fully autonomous, journey within the parking facility. Provision is made, for example, that the parking facility management system, based on the monitoring data, ascertains a target trajectory to be traveled by the motor vehicle and then transmits it to the motor vehicle via the wireless communication network.

According to one embodiment, the monitoring data are unevaluated monitoring data. In other words, for example, only the raw surroundings sensor data are therefore transmitted via the communication network to the motor vehicle and/or to the parking facility management system, and a respective evaluation can then occur in the motor vehicle and/or in the parking facility management system. The drone itself therefore does not need to be equipped with a correspondingly configured evaluation device, which considerably reduces the technical complexity of the drone.

According to one embodiment, provision is made that the drone has a processor, driving data and/or a remote-control instruction being ascertained by way of the processor based on monitoring data corresponding to the monitoring, based upon which a motor vehicle located within the parking facility can drive at least partly autonomously and/or can be remotely controlled, the driving data and/or the remote-control instruction being transmitted by way of a communication interface of the drone, via a wireless communication network, to the motor vehicle.

This produces in particular the technical advantage that the motor vehicle can drive efficiently within the parking facility, in particular partly autonomously, in particular fully autonomous, and/or in remotely controlled fashion.

Provision is therefore made in accordance with this embodiment that the monitoring data are evaluated in the drone itself in order to ascertain the remote-control instruction (or remote-control instructions; the plural is always also to be understood, and vice versa) and/or the driving data. In other words, in particular, according to one embodiment provision is therefore made that the drone remotely controls a motor vehicle located within the parking facility based on the monitoring data that the drone itself has ascertained by way of the monitoring device.

"Driving data" for purposes of the present invention encompass, for example, the following data: target trajectory data of a target trajectory that the motor vehicle is intended to travel; destination position data of a destination position to which the motor vehicle is intended to drive; correction trajectory data of a correction trajectory that the motor vehicle is intended to travel in order to return to its target trajectory.

In other words, in particular, "driving data" therefore encompass data that specify to the motor vehicle how it must drive within the parking facility in order to travel from a starting position to a destination position.

A destination position is, for example, a parking position at which the motor vehicle is intended to park. In this case the starting position is then, for example, a dropoff position at which the motor vehicle can be dropped off by its driver for execution of an automatic parking procedure.

The destination position is, for example, a pickup position at which the motor vehicle can be picked up by its user or driver after termination of an automatic parking procedure. In this case the starting position is then, for example, a parking position at which the motor vehicle is currently parked.

An automatic parking procedure is referred to in particular as "automated valet parking" (abbreviated AVP). In an AVP procedure of this kind, provision is made in particular that the motor vehicle parks within the parking facility automatically and without manual guidance on the part of its driver. For example, a driver parks his or her motor vehicle at a dropoff position. From there the motor vehicle drives automatically to a parking position and parks there. After termination of a parking period, or upon request on the part of the driver, provision is made in particular that the motor vehicle automatically drives from the parking position to a pickup position at which the driver can pick up his or her motor vehicle again. The pickup position is, for example, identical to the dropoff position.

"Automatic driving" encompasses, in particular, remote control of the motor vehicle and/or at least partly autonomous, in particularly fully autonomous, driving of the motor vehicle.

The fact that the drone ascertains the driving data by way of the processor and transmits them to the motor vehicle by way of the communication interface thus allows said vehicle to drive and/or navigate efficiently within the parking facility, and efficiently carry out an AVP procedure.

In one embodiment, provision is made that the drone has a processor, driving data and/or a remote-control instruction being ascertained by way of the processor based on monitoring data corresponding to the monitoring, based on which a motor vehicle located within the parking facility can drive at least partly autonomously and/or can be remotely controlled, the driving data and/or the remote-control instruction being transmitted by way of a communication interface of the drone, via a wireless communication network, to a parking facility management system for management of the parking facility.

This produces in particular the technical advantage that the parking facility management system itself no longer needs to ascertain the driving data and/or the remote-control instruction. The parking facility management system is thereby relieved of this computation-intensive task so that the parking facility management system can use its computation capacity in other ways. The parking facility management system can thus transmit the driving data and/or the remote-control instruction via a wireless communication network to the motor vehicle.

In one embodiment, provision is made that the parking facility management system transmits the driving data and/or the remote-control instruction via a wireless communication network to the motor vehicle.

According to one embodiment, provision is made that the drone has a communication interface by way of which a control instruction transmitted via a wireless communication network from a motor vehicle located within the parking facility and/or from a parking facility management system for managing the parking facility is received, the drone being controlled based on the received control instruction.

This produces in particular the technical advantage that the drone can be efficiently remotely controlled. Provision is thus made, for example, to cause the drone to fly, by way of a control instruction, to a specific sub-region within the parking facility which currently requires monitoring.

Provision is made, for example, that the drone is remotely controlled by way of a motor vehicle located within the parking facility and/or by way of a parking facility management system for managing the parking facility.

According to one embodiment, provision is made that the drone is operated in an autonomous operating mode.

This produces in particular the technical advantage that a computation capacity required for remote control of the drone can be used in other ways, since the drone is now flying autonomously.

According to one embodiment, the drone encompasses a remote-control device for remote control of a motor vehicle located within the parking facility based on the remote-control instruction or instructions.

According to one embodiment, provision is made that several drones are provided, one of the several drones being operated as a master drone, the others of the several drones being operated as slave drones.

This produces in particular the technical advantage that efficient operation of the several drones is enabled, since the slave drones are thereby directed by the master drone in terms of their flight. The master drone therefore, in particular, controls the slave drones and, for example, specifies to them where they are to fly or which sub-region they are to monitor. Efficient flight operation can thereby advantageously be achieved.

According to one embodiment, provision is made that the master drone remains in an immediate environment of a motor vehicle located within the parking facility in order to monitor the immediate environment of the motor vehicle, the slave drones remaining at a greater distance from the motor vehicle relative to the master drone in order to monitor a correspondingly distant environment.

This produces in particular the technical advantage that both the immediate environment and the distant environment can be efficiently monitored.

According to one embodiment, several drones are provided. The several drones are configured in particular identically or in particular differently. Provision is thus made, for example, that the master drone has a processor in order to ascertain driving data and/or remote-control instructions. Provision is thus made, for example, that the slave drones are free of such a processor. The slave drones encompass, for example, merely one or several surroundings sensors.

Statements that are made in connection with one drone apply analogously to several drones, and vice versa.

According to one embodiment, provision is made that several drones, which each monitor a sub-segment of the parking facility, are provided.

This produces in particular the technical advantage that efficient monitoring of the parking facility is enabled.

In a context of several drones, according to one embodiment provision is made that one or several or all of the drones are controlled by a motor vehicle located within the parking facility.

In a context of several drones, according to one embodiment provision is made that one or several or all of the drones are controlled by a parking facility management system for managing the parking facility.

In a context of several drones, according to one embodiment provision is made that one or several or all of the drones are controlled by a motor vehicle located within the parking facility; and that one or several of the drones are controlled by a parking facility management system for managing the parking facility.

For example, provision is made that the master drone is controlled by a motor vehicle located within the parking facility or by a parking facility management system for managing the parking facility, the master drone controlling the slave drone or drones.

In one embodiment, provision is made that the master drone flies autonomously, the master drone(s) being controlled by a motor vehicle located within the parking facility and/or by a parking facility management system for managing the parking facility.

According to a further embodiment, provision is made that in the context of a journey by a motor vehicle from one of the sub-segments into a further one of the sub-segments, the drone monitoring the one sub-segment notifies the further drone monitoring the further sub-segment that a motor vehicle will drive into its sub-segment.

This produces in particular the technical advantage that the drone that is monitoring the further sub-segment can efficiently prepare for the arrival of the motor vehicle.

In one embodiment, provision is made that the drone directly notifies the further drone that a motor vehicle will drive into its sub-segment, or the drone notifies the further drone indirectly via an intermediate station, in particular a motor vehicle or a parking facility management system for managing the parking facility, that a motor vehicle will drive into its sub-segment.

The notification from the one drone to the further drone is thus, according to one embodiment, a direct communication from the one drone to the further drone. In other words, the one drone directly, i.e., without intermediation, notifies the further drone that a motor vehicle will drive into its sub-segment.

According to one embodiment, the notification is thus a intermediated communication, i.e., an indirect communication between the one drone and the other drone. For example, the notification is sent via an intermediate station, i.e. a relay station. The intermediate station is, for example, the motor vehicle. The intermediate station is, for example, a parking facility management system for managing the parking facility. The provision of an intermediate station produces in particular the technical advantage that radio gaps can be bridged, and that stable communication can be guaranteed even over distances that are greater than the actual radio range of a drone.

According to one embodiment, provision is made that the drone encompasses a light-emitting device.

According to one embodiment, provision is made that the drone encompasses a light-emitting device with which a sub-region of the parking facility is illuminated.

This produces in particular the technical advantage that the sub-region of the parking facility can be efficiently illuminated. A video sensor of the monitoring device of the drone can thus, for example, efficiently detect the sub-region.

According to one embodiment, provision is made that the sub-region to be illuminated is defined based on a brightness measurement, so that only a sub-region which has a maximum brightness that is less than, or less than or equal to, a predetermined brightness value is illuminated.

This produces in particular the technical advantage that it is possible to ensure efficiently that only a sub-region that is not sufficiently bright and/or which is not already sufficiently brightly illuminated, for example to allow sufficient detection by way of a surroundings sensor, is illuminated.

The predetermined brightness value is defined or ascertained, for example, based on a sensitivity of a video sensor.

According to one embodiment, provision is made that the light-emitting device is a infrared light-emitting device. This means that the light-emitting means emits infrared radiation.

According to one embodiment, provision is made that the light-emitting device is a light-emitting diode.

According to one embodiment, the drone encompasses several light-emitting device. The several light-emitting devices are configured, for example, identically or differently.

A light-emitting device is, for example, an incandescent lamp, a gas discharge lamp, in particular an energy-saving lamp or a fluorescent lamp.

According to one embodiment, provision is made that the drone encompasses a brightness sensor that is configured to measure a brightness of a sub-region of the parking facility. For example, the brightness sensor is a photodiode.

According to one embodiment, provision is made that in the event of a danger to a traffic participant located within the parking facility, the traffic participant is warned by way of a signaling device of the drone.

This produces in particular the technical advantage that the traffic participant can efficiently be warned of the danger. Harm to the traffic participant can thereby advantageously be avoided.

According to one embodiment, a signaling device encompasses a light-emitting device (in general, an optical signal generator) for sending out a light signal. The light-emitting device is, for example, one of the light-emitting device described above. The optical signal generator thus preferably encompasses a light-emitting device.

According to one embodiment, the signaling device encompasses an acoustic signal generator, in particular a horn.

According to one embodiment, the signaling device encompasses a screen for displaying a warning. The screen is, for example, a liquid crystal display.

According to one embodiment, provision is made that the drone flies toward the traffic participant that is to be warned.

This produces in particular the technical advantage that the traffic participant can be quickly and efficiently warned of the danger.

Technical functionalities and features of the drone are evident analogously from corresponding technical functionalities and features of the method, and vice versa.

According to one embodiment, a "motor vehicle" for purposes of the present invention is an AVP motor vehicle. An "AVP motor vehicle" refers in particular to a motor vehicle that can carry out an automatic parking procedure. For example, an AVP motor vehicle is configured to be remotely controlled. For example, an AVP motor vehicle is configured to drive and/or navigate at least partly autonomously, in particular fully autonomously, within the parking facility.

The present invention is explained in further detail below with reference to preferred exemplifying embodiments.

DETAILED DESCRIPTION OF EXAMPLE EMBODIMENTS

Figure 1:
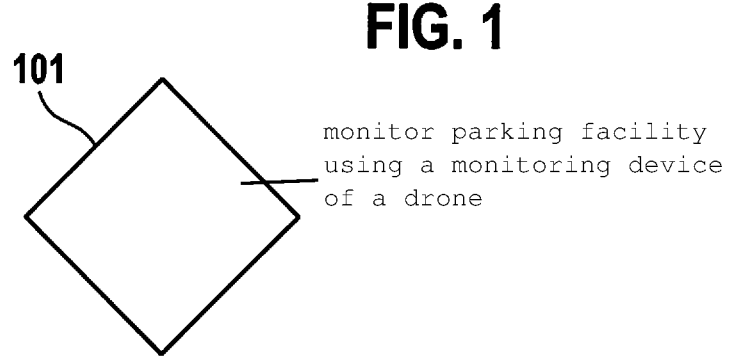
FIG. 1 is a flow chart of a method for monitoring a parking facility for motor vehicles.

FIG. 1 is a flow chart of a method for monitoring a parking facility for motor vehicles.

In accordance with a step 101, provision is made that the parking facility is monitored by way of a monitoring device of a flying drone.

In other words, a drone that encompasses a monitoring device is therefore used for monitoring of the parking facility. The drone thus flies in particular over the parking facility (or, in the case of a multi-level parking facility, within a level) and monitors it by way of the monitoring device. Provision is made, for example, that the drone monitors only a sub-segment or a sub-region of the parking facility. Provision is made, for example, that the drone ascertains, by way of a processor, driving data and/or remote-control instructions (or a remote-control instruction) for a motor vehicle located within the parking facility, and transmits them and/or it, by way of a communication interface, to the motor vehicle via a wireless communication network.

Figure 2:
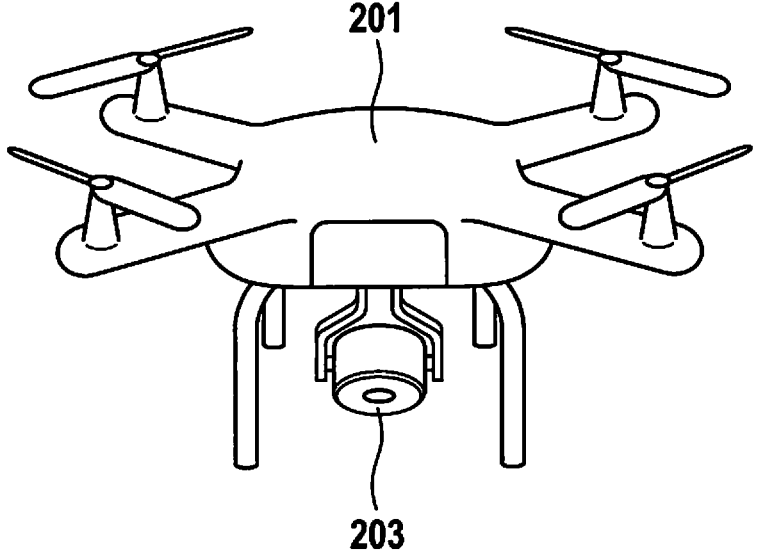
FIG. 2 shows a drone for monitoring a parking facility for motor vehicles.

FIG. 2 shows a drone 201 for monitoring a parking facility for motor vehicles. Drone 201 is configured, by way of example, as a quadcopter. Provision is made for other types of drone in embodiments that are not shown.

Drone 201 encompasses a video camera 203 as a monitoring device. According to a further embodiment, the monitoring device encompasses, instead of or in addition to video camera 203, one or several surroundings sensors such as those described in the context of this description.

Drone 201 is configured to execute or carry out the method for monitoring a parking facility for motor vehicles.

According to one embodiment, monitoring device 203 encompasses one or several surroundings sensors.

According to one embodiment, provision is made that the drone communicates with a parking facility management system and/or with a motor vehicle located within the parking facility. For example, the drone communicates directly with the motor vehicle.

According to one embodiment, provision is made that the monitoring data corresponding to the monitoring are transmitted by the drone, by way of the communication interface, to the parking facility management system and/or to the motor vehicle, so that the parking facility and/or the motor vehicle can analyze and/or evaluate the monitoring data. In other words, according to one embodiment, the drone is therefore more or less a flying surroundings sensor and does not need to have its own intelligence.

According to one embodiment, provision is made that the drone itself analyzes and/or evaluates the monitoring data by way of the processor and, for example, ascertains a remote-control instruction and/or driving data for the motor vehicle. Such remote-control instructions and/or driving data can also be referred to as "guidance signals." In other words, in particular, in accordance with this embodiment the drone possesses its own intelligence.

According to one embodiment, provision is made that the drone is managed and/or remotely controlled by way of the parking facility management system and/or by way of the motor vehicle.

According to one embodiment, provision is made that the drone is operated self-sufficiently, i.e., independently, i.e., autonomously, in particular after the drone starts up. In other words, after startup, the drone therefore in particular executes or carries out its function and/or functions assigned to it self-sufficiently, i.e., independently, i.e., autonomously. This function and/or these functions encompass in particular the monitoring and/or ascertainment of remote-control instructions and/or driving data.

According to one embodiment, several drones are provided to monitor, one drone acting as a master drone and the other drones as slave drones. According to one embodiment, the master drone remains in an immediate environment of the motor vehicle. According to a further embodiment, the slave drones monitor and/or analyze a respective area in a distant environment with respect to the motor vehicle.

This produces in particular the technical advantage that data, in particular monitoring data, can be ascertained for short-term as well as medium-/long-term predictive tasks.

The "immediate environment" of the motor vehicle refers in particular to an environment of the motor vehicle out to a distance of 3 meters, in particular 5 meters. The "more distant environment" refers in particular to an environment out to a maximum distance of 10 meters. The distances depend in particular on an architecture and topography of the parking facility.

According to one embodiment, provision is made that in a context of several drones, they act in zone-dependent fashion. In other words, in particular, a drone is responsible or has responsibility for a defined segment (sub-segment) or predetermined zone of the parking facility. For example, if a motor vehicle, in particular an AVP motor vehicle, is driving from that segment into the next segment, a further drone is then responsible or has responsibility for that next segment.

According to one embodiment, the drone encompasses one or several actuators. An actuator is, for example, a lamp, in particular an infrared lamp, in general a light-emitting means. If the drone happens to identify, for example by way of a brightness measurement, that a sub-region or a sub-segment of the parking facility does not exhibit sufficient brightness for detection thereof by way of a video sensor and/or infrared sensor, provision is then made that the drone illuminates the sub-region by way of the corresponding light-emitting means.

According to one embodiment, provision is made that the drone encompasses a signaling device. The signaling device encompasses, for example, an acoustic signal generator and/or an optical signal generator and/or a screen for displaying a warning.

If the drone detects or identifies a danger to a traffic participant located within the parking facility, provision is made that the drone flies toward that traffic participant and warns it by way of the signaling device.

A "traffic participant" for purposes of the present invention is, for example, a motor vehicle or a person. For example, several traffic participants are provided which, for example, must be warned.

Advantages of the concept according to the present invention of using a drone for the purpose of monitoring a parking facility, as compared with a monitoring system disposed in stationary fashion, are, for example, the following advantages:
reduction in cost;
more utilization options (for example, outputting a warning to traffic participants);
more flexible in use;
more updatable than a static infrastructure.

What is claimed is:
1. A method for monitoring a parking facility for motor vehicles, comprising:
monitoring the parking facility by way of a monitoring device of a flying drone, wherein:
several drones, which each monitor a respective sub-segment of the parking facility, are provided,
in the context of a journey by a motor vehicle from one of the sub-segments into a further one of the sub-segments, a drone monitoring the one sub-segment notifies a further drone monitoring the further sub-segment that a motor vehicle will drive into its sub-segment,
one of: i) the drone directly notifies the further drone that a motor vehicle will drive into its sub-segment, or ii) the drone notifies the further drone indirectly via an intermediate station, that the motor vehicle will drive into its sub-segment, and
the intermediate station is one of a motor vehicle, or a parking facility management system for managing the parking facility.
2. The method as recited in claim 1, wherein the drone has a communication interface, and the method further comprises:
transmitting, via the communication interface via a wireless communication network, monitoring data corresponding to the monitoring, to at least one of: i) a motor vehicle located within the parking facility, and ii) a parking facility management system for managing the parking facility.
3. The method as recited in claim 1, wherein the drone has a processor, and the method further comprising:
ascertaining, via the processor, at least one of i) driving data, and ii) a remote-control instruction, the ascertaining being based on monitoring data corresponding to the monitoring, and wherein, based on the at least one of the ascertained driving data and the ascertained remote-control instruction, at least one of: i) a motor vehicle located within the parking facility can drive at least partly autonomously, and ii) the motor vehicle within the parking facility can be remotely controlled; and transmitting, by way of a communication interface of the drone via a wireless communication network, the at least one of the ascertained driving data and the ascertained remote-control instruction, to the motor vehicle.

4. The method as recited in claim 1, wherein the drone has a communication interface by way of which a control instruction transmitted via a wireless communication network at least one of: i) from a motor vehicle located within the parking facility, and ii) from a parking facility management system for managing the parking facility, is received, the drone being controlled based on the received control instruction.

5. The method as recited in claim 1, wherein the drone is operated in an autonomous operating mode.

6. The method as recited in claim 1, wherein several drones are provided, one of the several drones being operated as a master drone, the others of the several drones being operated as slave drones.

7. The method as recited in claim 6, wherein the master drone remains in an immediate environment of a motor vehicle located within the parking facility to monitor the immediate environment of the motor vehicle, and the slave drones remain at a greater distance from the motor vehicle relative to the master drone to monitor a correspondingly distant environment.

8. The method as recited in claim 1, wherein the drone encompasses a light-emitting device with which a sub-region of the parking facility is illuminated.

9. The method as recited in claim 8, wherein the sub-region to be illuminated is defined based on a brightness measurement, so that only a sub-region which has a maximum brightness that is less than, or less than or equal to, a predetermined brightness value is illuminated.

10. The method as recited in claim 1, wherein, in the event of a danger to a traffic participant located within the parking facility, the traffic participant being warned by way of a signaling device of the drone.

11. The method as recited in claim 10, wherein the drone flies toward the traffic participant that is to be warned.

12. The method as recited in claim 1, wherein the monitoring device encompasses at least one of: a radar sensor, a video sensor, a laser sensor, a lidar sensor, an ultrasonic sensor, a magnetic sensor, and an infrared sensor.

13. The method as recited in claim 1, wherein the drone has a processor, and the method further comprises:

ascertaining, using the processor, at least one of driving data and a remote-control instruction, the at least one of the driving data and the remote-control instruction being ascertained based on monitoring data corresponding to the monitoring, wherein, based upon the at least one of the driving data and the remote-control instruction, a motor vehicle located within the parking facility at least one of: i) can drive at least partly autonomously, and ii) can be remotely controlled; and transmitting the at least one of ascertained driving data and ascertained remote-control instruction being transmitted by way of a communication interface of the drone via a wireless communication network, to a parking facility management system for managing the parking facility.

14. A drone for monitoring a parking facility for motor vehicles, the drone including a monitoring device and being configured to monitor the parking facility using the monitoring device, as the drone is flying, wherein:

the drone cooperates with several other drones, which each drone monitoring monitor a respective sub-segment of the parking facility, in the context of a journey by a motor vehicle from one of the sub-segments into a further one of the sub-segments, a drone monitoring the one sub-segment notifying a further drone monitoring the further sub-segment that a motor vehicle will drive into its sub-segment, one of: i) the drone directly notifies the further drone that a motor vehicle will drive into its sub-segment, or ii) the drone notifies the further drone indirectly via an intermediate station, that the motor vehicle will drive into its sub-segment, and the intermediate station is one of a motor vehicle, or a parking facility management system for managing the parking facility.

15. A non-transitory computer-readable storage medium on which is stored a computer program for monitoring a parking facility for motor vehicles, the computer program, when executed by a processor of a drone, causing the processor to perform:

monitoring the parking facility by way of a monitoring device as the drone is flying, wherein:

several drones, which each monitor a respective sub-segment of the parking facility, are provided, in the context of a journey by a motor vehicle from one of the sub-segments into a further one of the sub-segments, a drone monitoring the one sub-segment notifies a further drone monitoring the further sub-segment that a motor vehicle will drive into its sub-segment, one of: i) the drone directly notifies the further drone that a motor vehicle will drive into its sub-segment, or ii) the drone notifies the further drone indirectly via an intermediate station, that the motor vehicle will drive into its sub-segment, and the intermediate station is one of a motor vehicle, or a parking facility management system for managing the parking facility.

* * * * *